(12) United States Patent
Yoshida et al.

(10) Patent No.: US 8,828,597 B2
(45) Date of Patent: Sep. 9, 2014

(54) NON-AQUEOUS ELECTROLYTE BATTERY WHEREIN A BATTERY CASE AND A TERMINAL ARE CONNECTED THROUGH A SEMICONDUCTIVE RESIN PACKING

(71) Applicant: GS Yuasa International Ltd., Kyoto (JP)

(72) Inventors: Hiroaki Yoshida, Kyoto (JP); Nobutaka Imamura, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 13/746,417

(22) Filed: Jan. 22, 2013

(65) Prior Publication Data

US 2013/0136978 A1 May 30, 2013

Related U.S. Application Data

(62) Division of application No. 12/696,561, filed on Jan. 29, 2010, now Pat. No. 8,415,052, which is a division of application No. 11/002,178, filed on Dec. 3, 2004, now Pat. No. 7,964,305.

(30) Foreign Application Priority Data

Dec. 5, 2003 (JP) ................. 2003-407181

(51) Int. Cl.
| | |
|---|---|
| *H01M 2/06* | (2006.01) |
| *H01M 2/02* | (2006.01) |
| *H01M 2/26* | (2006.01) |
| *H01M 2/34* | (2006.01) |
| *H01M 2/30* | (2006.01) |
| *H01M 6/10* | (2006.01) |
| *H01M 10/0525* | (2010.01) |

(52) U.S. Cl.
CPC ............. *H01M 2/30* (2013.01); *H01M 2/0285* (2013.01); *H01M 6/10* (2013.01); *H01M 2/26* (2013.01); *Y02E 60/12* (2013.01); *H01M 10/0525* (2013.01); *H01M 2/342* (2013.01); *H01M 2/06* (2013.01)
USPC ........................... 429/178; 429/163; 429/176

(58) Field of Classification Search
None
See application file for complete search history.

(56) References Cited

U.S. PATENT DOCUMENTS

| | | | | |
|---|---|---|---|---|
| 3,945,850 | A | * | 3/1976 | Lewis ............................ 429/166 |
| 4,759,998 | A | | 7/1988 | Robinson et al. |

(Continued)

FOREIGN PATENT DOCUMENTS

| | | |
|---|---|---|
| EP | 0926796 A2 | 6/1996 |
| JP | 11067279 A | 3/1999 |

(Continued)

OTHER PUBLICATIONS

Japanese Office Action dated Feb. 23, 2010 in counterpart Japanese patent application No. 2003-407181.

(Continued)

*Primary Examiner* — Ula C Ruddock
*Assistant Examiner* — Tony Chuo
(74) *Attorney, Agent, or Firm* — Sughrue Mion, PLLC

(57) ABSTRACT

A non-aqueous electrolyte battery comprising: a battery case containing aluminum; a positive electrode terminal attached to the battery case; and a negative electrode terminal attached to the battery case and insulated from the battery case, wherein the positive electrode terminal and the battery case are connected through a resistor having resistance of 1Ω to 1 MΩ. Otherwise, A non-aqueous electrolyte battery comprising: a battery case containing iron; a negative electrode terminal attached to the battery case; and a positive electrode terminal attached to the battery case and insulated from the battery case, wherein the negative electrode terminal and the battery case are connected through a resistor having resistance of 1Ω to 1 MΩ.

4 Claims, 4 Drawing Sheets

(56) References Cited

U.S. PATENT DOCUMENTS

| | | | |
|---|---|---|---|
| 4,915,889 A * | 4/1990 | Procida et al. | 264/83 |
| 5,554,459 A * | 9/1996 | Gozdz et al. | 429/324 |
| 5,578,399 A | 11/1996 | Olsen | |
| 5,783,326 A | 7/1998 | Hasebe | |
| 5,856,773 A | 1/1999 | Chandler et al. | |
| 6,124,781 A | 9/2000 | Hogge et al. | |
| 6,335,117 B1 | 1/2002 | Yoshida et al. | |
| 7,122,093 B1 * | 10/2006 | Lee et al. | 156/292 |
| 7,351,496 B2 * | 4/2008 | Nakanishi et al. | 429/164 |
| 2002/0004160 A1 | 1/2002 | Shimada et al. | |
| 2002/0028374 A1 * | 3/2002 | Yoshida et al. | 429/94 |

FOREIGN PATENT DOCUMENTS

| | | | | |
|---|---|---|---|---|
| JP | 11111339 A | | 4/1999 | |
| JP | 2000353502 A | | 12/2000 | |
| JP | 2001283926 A | | 10/2001 | |
| JP | 2002164038 A | | 6/2002 | |
| JP | 2003157832 A | | 5/2003 | |
| JP | 2003346779 A | | 12/2003 | |
| JP | 2006-069046 | * | 3/2006 | B29C 47/14 |

OTHER PUBLICATIONS

Japanese Office Action issued on Mar. 15, 2011 in the corresponding Japanese Patent Application No. 2003-407181.

European Search report dated Nov. 18, 2005.

* cited by examiner

_US 8,828,597 B2_

NON-AQUEOUS ELECTROLYTE BATTERY WHEREIN A BATTERY CASE AND A TERMINAL ARE CONNECTED THROUGH A SEMICONDUCTIVE RESIN PACKING

This application is a divisional of application Ser. No. 12/696,561 filed Jan. 29, 2010, which is a divisional application of Ser. No. 11/002,178 filed Dec. 3, 2004, which claims priority from Japanese Patent Application No. 2003-407181 filed Dec. 5, 2003. The entire disclosures of the prior applications are hereby incorporated by reference.

FIELD OF THE INVENTION

This invention relates to a non-aqueous electrolyte battery having a positive electrode terminal and a negative terminal which are fixed to a battery case.

BACKGROUND ART

There are some kinds of the non-aqueous electrolyte secondary battery using a metallic battery case. There are the following three typical shapes. The first shape is a shape in which a positive electrode terminal (hereinafter simply referred to a positive terminal) and a negative electrode terminal (hereinafter referred to as a negative terminal) are both insulated from a metallic case. The second shape is a shape in which the negative terminal is insulated from the metallic case serving as the positive terminal. The third shape is a shape in which the positive terminal is insulated from the metallic case serving as the negative terminal.

The non-aqueous electrolyte secondary battery having the shape in which the positive terminal and the negative terminal are both insulated from the metallic case is disclosed in JP-A-2002-164038. A conventional structure example of this shape is shown in FIGS. 5 and 6. In FIGS. 5 and 6, reference numeral 1 denotes a generating element; 2 a metallic case; 3 a cover plate; 4 a positive terminal; 5 a negative terminal; 6 an insulating cylinder; 7 a terminal supporting plate; 8 an aluminum brazing alloy; and 9 a metallic brazing alloy.

This non-aqueous electrolyte secondary battery is manufactured as follows. The generating element 1 of a elliptic cylindrical winding type is housed in a metallic case 2 having a shape of a elliptic cylindrical case. With the cover plate 3 having an elliptical shape being fit in an upper end opening of the metallic case 2, a fitting area is sealing-fixed by welding.

The terminal supporting plates 7 are attached, respectively to both of the electrode terminal 4 connected to the positive electrode of the generating element 1 and the negative terminal 5 connected to the negative electrode of the generating element 1 through the insulating cylinder 6 made of ceramic. Namely, as seen from FIG. 6, the positive terminal 4 is inserted into a through-hole inside the insulating cylinder 6 made of ceramic. This fitting area is sealing-fixed by brazing using the aluminum brazing alloy 8. Further, the insulating cylinder 6 is inserted in an opening slot of the terminal supporting plate 7. The fitting area is sealing-fixed by brazing using the metallic brazing alloy 9. Now, the positive terminal 4 is made of an aluminum alloy because it is not dissolved in a non-aqueous electrolyte solution at a positive electrode potential. The brazing member between the positive terminal 4 and the insulating cylinder 6, which is at the positive electrode potential, is also made of the aluminum brazing alloy 8. The terminal supporting plates 7 are insulated from the positive electrode and the negative electrode so that they are not placed at both the potential of the positive electrode and the potential of the negative electrode. For this reason, the terminal supporting plate 7 is made of an aluminum alloy, stainless steel or nickel-plated iron plate. Where the terminal supporting plate 7 is made of the aluminum alloy, the metallic brazing alloy 9 between itself and the insulating cylinder 6 is made of the aluminum brazing alloy.

The negative terminal 5 shown in FIG. 5, like the positive terminal 4, is also inserted in the through-hole inside the insulating cylinder 6 of ceramic. The fitting area is sealing-fixed by brazing using the copper-alloy brazing such as gold-copper brazing alloy. Further, the insulating cylinder 6 is inserted in an opening slot of the terminal supporting plate 7. The fitting area is sealing-fixed by brazing. Now, the negative terminal 5 is made of copper or copper alloy which is difficult to generate electro-chemical corrosion such as alloying with lithium at the negative electrode potential. The brazing member between the negative terminal 5 and insulating cylinder 6, which is at the negative electrode potential, is made of the copper-alloy system metallic brazing. Further, the brazing member of the fitting area between the terminal supporting plate 7 and insulating cylinder 6 is made of the aluminum brazing alloy as in the case of the positive electrode.

The terminal supporting plates 7, 7 with the positive terminal 4 and negative terminal 5 sealing-fixed through the insulating cylinders 6, 6, respectively are sealing-fixed by welding in a state where they are fit in the opening slots made in the cover plate 3. The generating element 1 attached to the bottom of the cover plate 3 is inserted in the interior of the metallic case 2. Thereafter, with the cover plate 3 fit in the opening at the upper end of the metallic case 2, the interior of the battery case is sealed by welding.

The non-aqueous secondary battery having the shape in which the metallic case serves as the positive terminal and the negative terminal is insulated from the metallic case is disclosed in JP-A-2003-157832. In the battery having this shape, the battery case is made of aluminum. An aluminum foil serving as a positive electrode collector and the battery case are connected through electron conduction by contact or welding. On the other hand, an insulator is provided between the negative terminal and battery case so that the negative terminal is insulated from the metallic case.

Further, the non-aqueous electrolyte secondary battery having the shape in which the metallic case serves as the negative terminal and the positive terminal is insulated from the metallic case is disclosed in JP-A-11-111339. In the battery having this shape, the battery case is made of nickel-plated iron (steel) or stainless steel. A copper foil serving as a negative electrode collector and the battery case are connected through electron conduction by contact or welding. On the other hand, an insulator is provided between the positive terminal and battery case so that the positive terminal is insulated from the metallic case.

Further, JP-A-2001-283926 discloses the following lithium secondary battery. The battery case is made of SUS304; the positive terminal is made of an aluminum alloy; and the negative terminal is made of a copper alloy. The positive terminal and negative terminal are attached to the battery case so that they are insulated therefrom. The positive terminal and battery case are connected to both ends of a bimetal serving as a temperature switch, respectively. Since the temperature switch is normally opened, the positive terminal is insulated from the battery case. However, where the battery has abnormally generated heat because of e.g. overcharge, the temperature switch is closed so that conduction between the positive terminal and battery case is assured. Further, a resist or is provided at a position separated from the lithium battery case, and both ends of the resistor element are connected to the negative terminal and battery case, respectively. The gist of the invention disclosed in this patent document is as follows. When the battery has abnormally generated heat because of e.g. overcharge, the temperature switch is closed so that the positive terminal and negative terminal are connected to each other through the resistor. Therefore, a safety mechanism that the energy accumulated in the generating element is consumed through Joule heating operates. Further, since the resistor generating the Joule heating is provided outside the battery, the battery is excellent in heat dissipation. Claim 2 of this patent document defines that the resistance of the conduction circuit between the positive terminal and negative terminal when the temperature switch is closed is set at $Ec/(I_0 \times 10)$ or lower. In this case, Ec represents a charging ending voltage which is managed during normal charging; and $I_0$ represents a current value when the rated capacity of the battery is charged for one hour at a constant current. Further, claim 4 of this patent document discloses that the rated capacity of the lithium secondary battery is set in a range of 1 Ah to 10 Ah.

JP-A-2000-353502 provides the following description. The battery case constructed of an aluminum laminate sheet has been proposed and put into practice. However, the inner resin of the aluminum laminate sheet may be passed through owing to any abnormality such as burr of the electrode collector or mixing of a metallic alien substance into the interior of the battery. In this case, the aluminum foil within the aluminum laminate sheet may be brought into contact with the negative electrode so that it falls into a negative electrode potential. In this case, a lithium-aluminum alloy is created so that the aluminum foil is pulverized. As a result, the airtight of the aluminum laminate deteriorates, thus leading to reduction of reliability of the battery. However, even where the contact occurs between the aluminum foil and the negative electrode, this could not be immediately detected. This problem can be solved by electrically connecting the metal of the laminate sheet to the positive electrode. Such a configuration permits the potential of the laminated metal to accord with the potential of the positive electrode. Thus, where the laminated metal is brought into contact with the negative electrode, this will be detected as a change in the terminal voltage of the battery. As an example of the metal constituting the laminate of the metal and resin, aluminum or its alloy is named. As an example of the method for connecting the metal of the laminated sheet to the positive electrode, connecting the metal of the laminated sheet to the positive terminal by a conductive adhesive tape is proposed. In the battery described in the embodiment disclosed in JP-A-2000-353502, lithium-cobalt composite oxide is employed as the positive electrode active material and graphite is employed as the negative electrode active material.

SUMMARY OF THE INVENTION

The non-aqueous electrolyte secondary battery is involved in two problems that it may be erroneously short-circuited when batteries are connected in series or in parallel to make a composite battery and short-circuited during use for a long time.

For example, on the way of assembling, into a composite battery, the battery in which the metallic battery case and the positive terminal are connected so that the battery case serves as the positive terminal and the battery in which metallic battery case and the negative terminal are connected so that the battery case serves as the negative terminal, where the battery case is inadvertently brought into contact with the terminal by e.g. a tool, the short-circuiting will occur between the terminal and the battery case. Owing to this short-circuiting, a current of several thousands amperes flows through the contact area to generate violent sparks. As a result, a worker may be injured and the battery may be broken.

On the other hand, generally, in the non-aqueous electrolyte secondary battery having a capacity exceeding 5 Ah, in order to prevent the short-circuiting from occurring when batteries are connected in series or in parallel to make the composite battery, the positive terminal and negative terminal are insulated from the metallic battery case, respectively. In such a configuration, the problem of short-circuiting does not occur in both contacts between the battery case and positive terminal and between the battery case and negative terminal.

Where the non-aqueous electrolyte secondary battery is used for a long time, water in the air and conductive granules may be applied to the insulator between the terminal and metallic battery case, thereby deteriorating the insulation.

If the insulation between the terminal and battery case is insufficient, the problem of corrosion of the battery case was presented. For example, in the battery having the shape in which the battery case is made of aluminum or aluminum alloy and the positive terminal and negative terminal are insulated from the metallic case, as the case may be, the following problem occurred. Where the insulation between the negative terminal and the battery case becomes insufficient during the use for a long time, the battery case (aluminum) is electrically connected to the negative electrode active material through the negative terminal. Since both the negative electrode active material and battery case (aluminum) are in contact with an electrolyte solution, the following reaction occurs.

Negative electrode: $LiC_6 \rightarrow Li^+ + 6C + e^-$

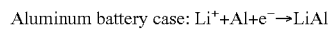

Aluminum battery case: $Li^+ + Al + e^- \rightarrow LiAl$

In this way, on the aluminum battery case, since the alloying reaction of the lithium ions in the electrolyte solution with the aluminum battery case proceeds, leakage of the electrolyte solution due to the corrosion of the battery case occurs. Further, since the lithium in the negative electrode active material is consumed, attenuation in the battery capacity is problematic.

On the other hand, in the battery having the shape in which the battery case is made of "stainless steel" or "nickel-plated steel plate and both the negative terminal and the positive terminal are insulated from the metallic case, as the case may be, the following problem occurred. Where the insulation between the positive terminal and the battery case become insufficient during the use for a long time, the following reaction occurs in the battery case.

$Fe \rightarrow Fe^{3+} + 3e^-$

Therefore, on the battery case, the dissolving reaction of the battery case proceeds. This led to the problem of leakage of the electrolyte solution due to the corrosion of the battery case. Further, discharge of the positive electrode active material corresponding to the electrical quantity of the dissolving reaction of iron occurs. This led to the problem of reduction in the battery capacity.

Where the battery case contains aluminum, the problem of corrosion of the battery case can be solved by connecting the battery case to the positive electrode through electron conduction. Because of this measure, even if poor insulation occurs between the battery case and the negative terminal, the potential of the battery case will not become the negative electrode potential. This suppresses alloying of aluminum of the battery case and lithium.

Where the battery case contains iron, the problem of corrosion of the battery case can be solved by connecting the battery case to the negative electrode through electron conduction. Because of this measure, even if poor insulation occurs between the battery case and the positive terminal, the potential of the battery case will not become the positive electrode potential. This suppresses dissolving of iron of the battery case into the electrolyte solution.

However, where the battery case is connected to the positive electrode or negative electrode through the electron conduction, the following new problem will occur. During the use of the battery or on the way of making the composite battery by connecting a plurality of batteries, as the case may be, the insulated terminal may be inadvertently brought into contact with the battery case by e.g. tool. In this case, since the battery case is connected to the electrode having the polarity opposite to that of the terminal at issue through the electron conduction, the short-circuiting occurs owing to the tool. As the case may, this short-circuiting generates sparks so that the battery and its peripheral components are damaged.

This invention intends to solve all these problems. Namely, this invention provides a battery which can suppress corrosion of a battery case even if poor insulation occurs between a terminal and the battery case. In addition, this invention provides a battery which is difficult to damage the battery and its peripheral components due to the generation of sparks.

The first invention according to this invention is a non-aqueous electrolyte battery comprising a battery case containing aluminum, a positive terminal attached to the battery case and a negative terminal attached to the battery case and insulated therefrom wherein the positive terminal is connected to the battery case through a resistor having resistance of 1Ω to 1 MΩ.

In the first invention, since the positive terminal is connected to the battery case through the electron conduction, even if poor insulation occurs between the negative terminal and the battery case, the potential of the battery case will not become the negative electrode potential. Thus, corrosion of the battery case is suppressed. In addition, since the positive terminal is connected to the battery case through a resistance of 1Ω to 1 MΩ, even if the negative terminal is erroneously short-circuited with battery case, generation of violent sparks can be suppressed. As a result, damage of the battery and its peripheral components is suppressed.

The second invention according to this invention is a non-aqueous battery comprising a battery case containing iron, a negative terminal attached to the battery case and a positive terminal attached to the battery case and insulated therefrom wherein the negative terminal is connected to the battery case through a resistance of 1Ω to 1 MΩ.

In the second invention, since the negative terminal is connected to the battery case through the electron conduction, even if poor insulation occurs between the positive terminal and the battery case, the potential of the battery case will not become the positive electrode potential. Thus, corrosion of the battery case is suppressed. In addition, since the negative terminal is connected to the battery case through a resistance of 1Ω to 1 MΩ, even if the positive terminal is erroneously short-circuited with battery case, generation of violent sparks can be suppressed. As a result, damage of the battery and its peripheral components is suppressed.

Incidentally, after the electrolyte solution has been injected into the battery, the terminal and the battery case are communicated with each other by the electrolyte solution. In this case, a resistor due to ion conduction is generated between the terminal and the battery case. In this invention, the terminal and the battery case are communicated with each other through not the ion conduction but an electron conduction body having resistance of 1Ω to 1 MΩ.

Further, in this invention, the "battery case containing aluminum" refers to the battery case containing aluminum and aluminum alloy. The "battery case containing iron" refers to the battery case containing iron, steel, stainless steel or these elements plated with nickel.

DETAILED DESCRIPTION OF THE INVENTION

Figure 1:
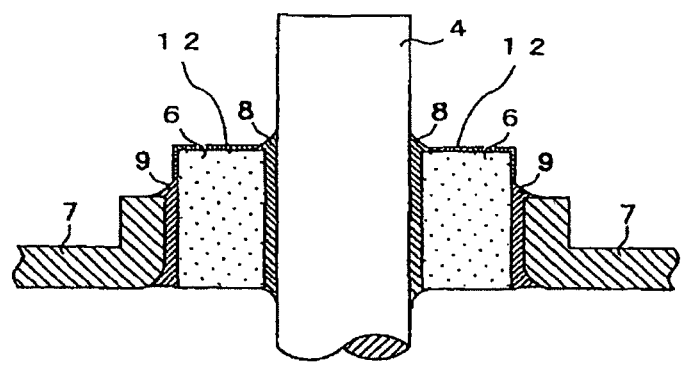
FIG. 1 is a partially enlarged longitudinal-sectional view showing the structure of a terminal for a non-aqueous electrolyte secondary battery in the case where a conductive resin coating is formed on the surface of a terminal insulating cylinder according to Example 1 of the invention.

Now referring to the drawings, an explanation will be given of preferred modes for carrying out the invention on the basis of various embodiments.

EXAMPLES

Referring to the drawings, an explanation will be given of the mode for carrying out this invention.

Examples 1 to 5 and Comparative Examples 1 to 3

Example 1

Figure 6:
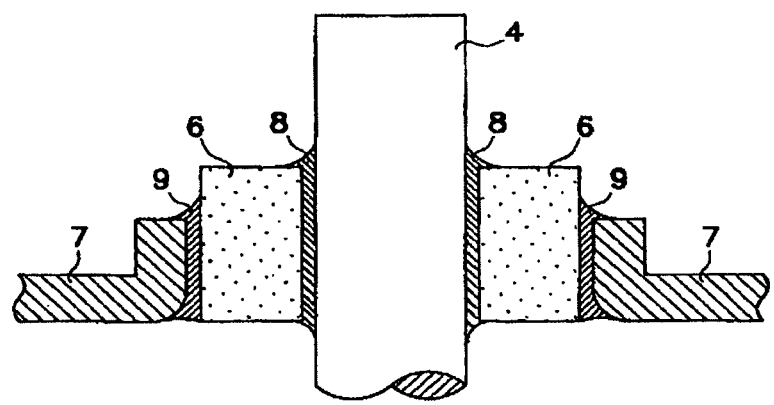
FIG. 6 is a partially enlarged longitudinal-sectional view of a terminal of the conventional non-aqueous electrolyte secondary battery.

FIG. 1 is a partially enlarged longitudinal-sectional view showing a positive terminal of a non-aqueous electrolyte secondary battery according to Example 1 of the invention. In FIG. 1, like reference numerals refer to constituent elements having the same function in the prior art in FIG. 6. Reference numeral 12 denotes a resin coating.

In FIG. 1, a positive terminal 4 is inserted from below in the through-hole inside an insulating cylinder 6 of ceramic. The positive terminal 4 is a cylindrical pin of aluminum or aluminum alloy which is not dissolved in the non-aqueous electrolyte solution at a positive electrode potential. Although not shown, like the prior art battery shown in FIG. 5, the lower end of the positive terminal 4 is welded to a collector plate connected to the positive electrode of the generating element whereas the upper end of the positive terminal 4 is projected upward from the insulating cylinder 6. The insulating cylinder 6 of ceramic is made of 99%-alumina difficult to be corroded in the non-aqueous electrolyte solution. On the surface thereof, the resin coating 12 is formed which is made of semiconductive polyamideimide resin dispersed with carbon. By means of the resin coating 12, the battery case and the positive terminal 4 are connected to each other through electron conduction by a resistor having resistance of 1MΩ in a state before the electrolyte solution is injected.

Although not shown, like the positive terminal 4, a negative terminal 5 is also inserted from below in the through-hole inside the insulating cylinder of ceramic. The negative terminal 5 is a cylindrical pin of copper or copper alloy which is difficult to be electrochemically corroded at a negative electrode potential. Further, like the prior art battery shown in FIG. 5, the lower end of the negative terminal 5 is welded to the collector plate connected to the negative electrode of the generating element whereas the upper end of the negative terminal 5 is projected upward from the insulating cylinder 6. The insulating cylinder 6 of ceramic, like that employed for the positive electrode, is made of insulating 99%-alumina. Thus, the negative electrode 5 is insulated from the battery case through electron conduction.

Figure 5:
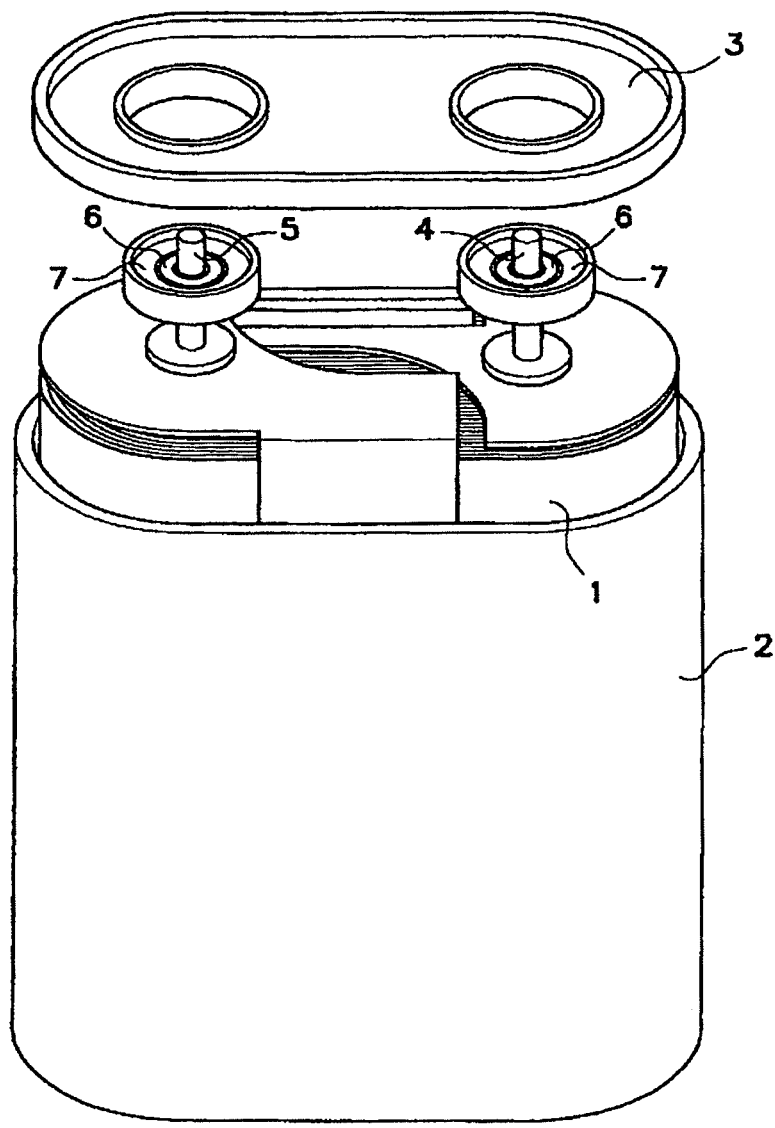
FIG. 5 is an assembled perspective view showing the structure of a conventional non-aqueous electrolyte secondary battery.

Like the prior art shown in FIG. 5, the insulating cylinder 6 with the positive terminal 4 fixing-sealed and the insulating cylinder 6 with the negative terminal 5 fixing-sealed are inserted into the opening slots of the terminal supporting plates 7, 7, respectively. This fitting area is sealing-fixed by brazing using aluminum brazing alloy. Further, like the prior art, the terminal supporting plates 7, 7 with the positive terminal 4 and the negative terminal 5 sealing-fixed, respectively are sealing-fixed by welding in a state where they are fit in the opening slots made in a cover plate 3. Further, with the generating element 1 being housed in the interior of the metallic case 2 and with the cover plate 3 fit in the opening at the upper end of the metallic case 2, the interior of the battery exterior body is sealed by welding.

In the battery structure described above, the non-aqueous electrolyte secondary battery according to Example 1 was manufactured in which carbon is employed as the negative electrode active material and lithium cobalt oxide is employed as the positive electrode active material. The non-aqueous electrolyte of this secondary battery is preferably an organic solvent containing cyclic carbonic ester such as ethylenecarbonate or propylenecarbonate and chain carbonic ester such as diethylcarbonate, dimethylcarbonate or ethylmetylcarbonate, in which lithium salt such as $LiPF_6$ is dissolved. The insulating cylinders for the positive terminal and negative terminal were both made of insulating ceramic. The battery shape was elliptic cylindrical and the battery case was made of aluminum alloy. The battery has a width of 130 mm, a thickness of 50 mm and a height of 208 mm. The capacity thereof is 100 Ah.

Example 2

The non-aqueous electrolyte secondary battery according to Example 2 was manufactured in the same manner as in Example 1 except that the quantity of carbon of the carbon-doped polyamide resin applied to the battery outer surface of the insulating cylinder of the positive terminal is adjusted to provide a resistance of 10 kΩ between the positive terminal and battery case in the battery before the electrolyte solution is injected.

Example 3

The non-aqueous electrolyte secondary battery according to Example 3 was manufactured in the same manner as in Example 1 except that the quantity of carbon of the carbon-doped polyamide resin applied to the battery outer surface of the insulating cylinder of the positive terminal is adjusted to provide a resistance of 100Ω between the positive terminal and battery case in the battery before the electrolyte solution is injected.

Example 4

The non-aqueous electrolyte secondary battery according to Example 4 was manufactured in the same manner as in Example 1 except that the quantity of carbon of the carbon-doped polyamide resin applied to the battery outer surface of the insulating cylinder of the positive terminal is adjusted to provide a resistance of 10Ω between the positive terminal and battery case in the battery before the electrolyte solution is injected.

Example 5

The non-aqueous electrolyte secondary battery according to Example 5 was manufactured in the same manner as in Example 1 except that the quantity of carbon of the carbon-doped polyamide resin applied to the battery outer surface of the insulating cylinder of the positive terminal is adjusted to provide a resistance of 1Ω between the positive terminal and battery case in the battery before the electrolyte solution is injected.

Comparative Example 1

The non-aqueous electrolyte secondary battery according to Comparative Example 1 was manufactured in the same manner as in Example 1 except that the quantity of carbon of the carbon-doped polyamide resin applied to the battery outer surface of the insulating cylinder of the positive terminal is adjusted to provide a resistance of 100 mΩ between the positive terminal and battery case in the battery before the electrolyte solution is injected.

Comparative Example 2

The non-aqueous electrolyte secondary battery according to Comparative Example 2 was manufactured in the same manner as in Example 1 except that the quantity of carbon of the carbon-doped polyamide resin applied to the battery outer surface of the insulating cylinder of the positive terminal is adjusted to provide a resistance of 10 mΩ between the positive terminal and battery case in the battery before the electrolyte solution is injected.

Comparative Example 3

The non-aqueous electrolyte secondary battery according to Comparative Example 3 was manufactured in the same manner as in Example 1 except that the insulating cylinder is not provided between the positive terminal and the battery case and the positive terminal of aluminum is directly welded to the battery case of aluminum alloy.

In order to confirm the effect of suppressing spark generation in assembling the battery according to this invention, the following test was carried out. After the eight kinds of batteries according to the first to fifth embodiments and the first to third comparative examples had been charged to a voltage of 4.0 V at a current of 20 A, an external short-circuiting test was carried out on the assumption that an accident occurred in assembling the battery. A driver of steel was used in the test.

The test of bringing the negative terminal into contact/short-circuited with the battery was carried out ten times. The probability of spark generation and abnormality of the battery is shown in Table 1.

TABLE 1

| Kind of Battery | Positive Terminal/ Case Resistance | Probability of Spark Generation | Battery Abnormality |
|---|---|---|---|
| Example 1 | 1 MΩ | 0% | None |
| Example 2 | 10 kΩ | 0% | None |
| Example 3 | 100 Ω | 0% | None |
| Example 4 | 10 Ω | 0% | None |
| Example 5 | 1 Ω | 40% | None(only slight spark) |
| Comparative Example 1 | 100 mΩ | 90% | Contact was made black (weak spark) |
| Comparative Example 2 | 10 mΩ | 100% | Contact was molten (strong spark) |
| Comparative Example 3 | <1 mΩ | 100% | Battery was bored (severe spark) |

As apparent from the results shown in Table 1, in the batteries according to Examples 1 to 5 having a resistance of 1Ω to 1 MΩ between the positive terminal and the battery case, even if the negative terminal is brought into contact with the battery case, the generation of discoloring or melting in the contact area is prevented, thereby suppressing damage of the battery. This is because the positive terminal and the battery case are connected through the resistance of 1Ω or more so that the short-circuiting current was suppressed.

In accordance with the battery structure of this invention, the negative terminal is insulated from the battery case. On the other hand, the resistance of the resistor between the positive terminal and the battery case within a range from 1Ω to 1 MΩ. Therefore, on the way of assembling the composite battery, even when the positive terminal and the battery case are inadvertently brought into contact with each other by e.g. a tool, since the battery case and the negative terminal are insulated from each other, a current does not flow through the contact. On the other hand, even when the negative terminal and the battery case are inadvertently brought into contact with each other by e.g. the tool, since the battery case and the negative terminal are connected to each other by the resistance of 1Ω to 1 MΩ. For this reason, assuming that a potential difference of 4V has occurred, the flowing current is as small as 4 A (4V/1Ω) to 4 μA (4V/1MΩ). As a result, the generation of sparks is suppressed so that damage of the battery can be surely prevented.

Generally, the sparks due to the short-circuiting occur when the current of about 10 A flows. In the non-aqueous electrolyte secondary battery having a terminal voltage of 4 V and resistance of 1Ω between the positive terminal and the battery case, the current of about 4 A flows when the negative terminal and the battery case are brought into contact with each other. However, the current of this degree generates a small amount of sparks. Thus, in order to prevent the generation of sparks, the resistance between the positive terminal and the battery case must be 1Ω for in anticipation of safety.

Further, where the battery in which both the positive terminal and negative terminal are insulated from the battery case are employed, in order to prevent the corrosion of the battery case, the negative terminal and battery case must be insulated by the value of a resistance of 10 MΩ or more.

However, during the use for a long time, application of conductive granules and water may attenuate the insulation between the negative terminal and the battery case to 1 MΩ. In this case, the corrosion of the battery case will occur. Thus, by setting the value of the resistance between the positive terminal and the battery case at 1 MΩ or less, the current flowing between the negative terminal and the battery case flows between the battery case and the positive terminal connected thereto by the resistance of 1Ω to 1 MΩ. Thus, the corrosion reaction of the battery case of aluminum alloy does not proceed, thereby surely preventing the deterioration of the battery.

Incidentally, in the embodiments described above, the explanation was given of the case where the resin coating of polyamideimide resin dispersed with carbon is formed on the surface of the insulating cylinder 6. However, other kinds of conductive resin may be employed. These materials may be carbon-dispersed polyimide resin, thermoplastic resin such as polypropylene and polyethylene or cellulose in addition to thermosetting resin such as carbon-dispersed epoxy resin Further, although the example in which the resin coating is formed outside the battery was given, it can be formed inside the battery as long as the resin coating has resistance or tolerance to the electrolyte solution and is stable at an oxidation-reduction potential of the terminal.

The value of the resistance between the terminal and the battery case connected through such a conductive resin coating must be in the range from 1Ω to 1 MΩ. The range is preferably from 10Ω to 100 kΩ, and more preferably 100Ω to 10 kΩ.

By adjusting the conductivity, thickness or length of the resin coating formed on the surface of the insulating cylinder, the resistance between the terminal and the battery case can be set in the above preferred range. As a result, both suppressing spark generation in assembling the composite battery and preventing the deterioration of the battery case due to the poor insulation between the terminal and the battery case can be realized to a high degree. Further, the method of connecting the terminal and the battery case through electron conduction can be realized by arranging a resistor element, crimp contact or screw between the terminal and the battery case. However, the above embodiments (using the conductive resin coating), which can be realized in substantially the same structure and number of components as in the prior art, are excellent in cost and workability and permits a compact battery to be designed.

Example 6

Figure 2:
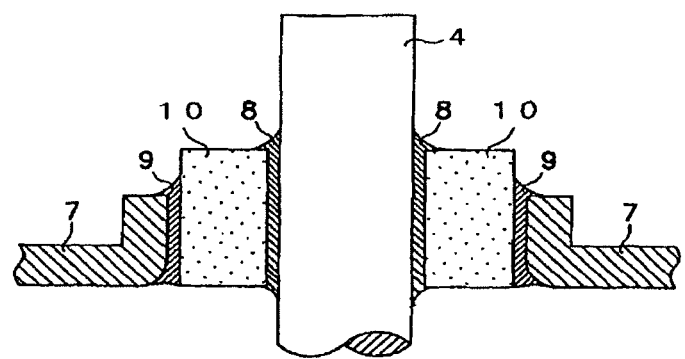
FIG. 2 is a partially enlarged longitudinal-sectional view showing the structure of a terminal for a non-aqueous electrolyte secondary battery in the case where a fixing-sealing component for the terminal is made of conductive ceramic according to Example 6 of the invention.

FIG. 2 is a partially enlarged longitudinal-sectional view showing a positive terminal of a non-aqueous electrolyte secondary battery according to Example 6 of the invention. In FIG. 2, like reference numerals refer to constituent elements having the same function in the prior art in FIG. 6. Reference numeral 10 denotes a terminal fixing cylinder.

FIG. 2 shows the structure of the positive terminal of the non-aqueous electrolyte secondary battery using the same positive terminal and ceramic hermetic seal as in the prior art, according to Example 6 of the invention. Like that shown in FIG. 5, the case of this non-aqueous electrolyte secondary battery includes a metallic case of aluminum alloy having a shape of a elliptic cylindrical case, a cover plate fit in the opening at the upper end of the metallic case and sealing-fixed by welding and terminal supporting plates fit in the opening slots of the cover plate and sealing-fixed by welding, respectively.

As seen from FIG. 2, a positive terminal 4 is inserted from below in the through-hole inside the terminal fixing cylinder 10 of semiconductive ceramic and sealing-fixed to the terminal supporting plate 7 through the terminal fixing cylinder 10. The positive terminal 4 is a cylindrical pin of aluminum or aluminum alloy which is not dissolved in the non-aqueous electrolyte solution at a positive electrode potential.

Like the prior art battery shown in FIG. 5, the lower end of the positive terminal 4 is welded to a collector plate connected to the positive electrode of the generating element whereas the upper end of the positive terminal 4 is projected upward from the insulating cylinder 6. The terminal fixing cylinder 10 of semiconductive ceramic is mainly made of alumina difficult to be corroded in the non-aqueous electrolyte solution and has semi-conductivity because it is doped with titanium oxide (TiO) which is a conductive component. The terminal supporting plate 7 is made of aluminum or aluminum alloy.

Incidentally, in the battery according to Example 6, the example was given in which the terminal fixing cylinder 10 is made of alumina doped with titanium oxide. However, other kinds of conductive resin may be employed. These materials may be alumina doped with titanium carbide (TiC), zirconia doped with niobium carbide (NbC), zirconia doped with tungsten carbide (WC), or silicon carbide (SiC) doped with tungsten carbide (WC).

Now, the boundary between the positive terminal 4 and terminal fixing cylinder 10 is brazed using aluminum brazing alloy 8. The boundary between the terminal fixing cylinder 10 and the terminal supporting plate 7 is also brazed using aluminum brazing alloy 9. The brazed area of the aluminum brazing alloy 8 is covered with a metallized layer.

Although not shown, the negative terminal is also inserted from below in the through-hole inside the terminal fixing cylinder of insulating ceramic and sealing-fixed to the terminal supporting plate through the terminal fixing cylinder. The negative terminal is a cylindrical pin having the same shape as the positive terminal 4 but is made of copper or copper alloy which is difficult to be electrochemically corroded at a negative electrode potential.

The lower end of the negative terminal is welded to the collector plate connected to the negative electrode of the generating element whereas the upper end of the negative terminal is projected upward from the terminal fixing cylinder. The terminal fixing cylinder of ceramic is made of insulating 99%-alumina. The boundary between the negative terminal and the terminal fixing cylinder is brazed using copper system brazing alloy such as gold-copper brazing alloy. The boundary between the terminal fixing cylinder and the terminal supporting plate is brazed using aluminum brazing alloy. The brazed area of the copper system brazing alloy is covered with a metallized layer. Thus, the negative terminal 5 is insulated from the battery case through electron conduction.

Like the prior art shown in FIG. 5, the terminal fixing cylinder with the positive terminal fixing-sealed and the terminal fixing cylinder with the negative terminal fixing-sealed are inserted into the opening slots of the terminal supporting plates 7, 7, respectively. This fitting area is sealing-fixed by brazing using aluminum brazing alloy. Further, like the prior art, the terminal supporting plates 7, 7 with the positive terminal 4 and the negative terminal 5 sealing-fixed, respectively are sealing-fixed by welding in a state where they are fit in the opening slots made in a cover plate 3. Further, with the generating element 1 being housed in the interior of the metallic case 2 and with the cover plate 3 fit in the opening at the upper end of the metallic case 2, the interior of the battery exterior body is sealed by welding.

In the battery according to Example 6, the positive terminal 4 is electrically connected to the battery case through the terminal fixing cylinder 10 having semiconductivity and the terminal supporting plate 7.

By adjusting the conductivity, thickness or length of the ceramic employed for the terminal fixing cylinder, the value of the resistance between the positive terminal and the battery case can be set in the range from 1Ω to 1 MΩ. As a result, like Examples 1 to 5, both suppressing spark generation in assembling the composite battery and preventing the deterioration of the battery case due to the poor insulation between the terminal and the battery case can be realized to a high degree.

Example 7

Figure 3:
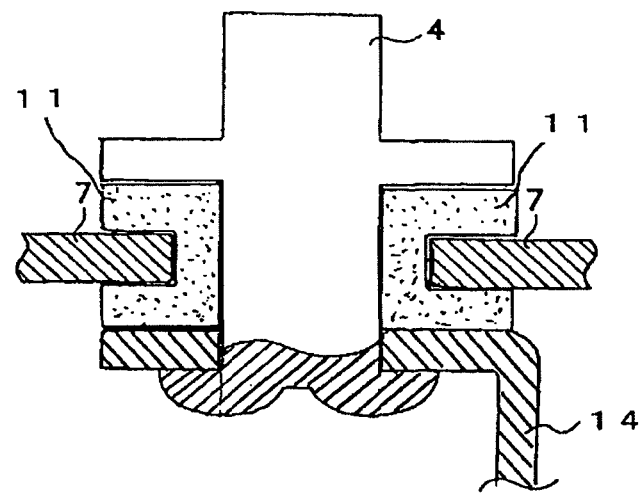
FIG. 3 is a partially enlarged longitudinal-sectional view showing the structure of a terminal for a non-aqueous electrolyte secondary battery in the case where a fixing-sealing component for the terminal is formed of conductive resin packing according to Example 7 of the invention.

FIG. 3 is a partially enlarged longitudinal sectional view of the terminal of the non-aqueous electrolyte secondary battery according to Example 7 of the invention. In FIG. 3, reference numeral 4 denotes a positive terminal; 7 a terminal supporting plate; 11 a semiconductive resin packing; and 14 a positive electrode lead.

As seen from FIG. 3, in Example 7, as the terminal fixing cylinder, the resin packing 11 is adopted in place of ceramic. The positive terminal 4 is sealing-fixed to the terminal supporting plate 7 of aluminum alloy by caulking through the semiconductive resin packing 11 of polyphenylene sulfide (PPS) dispersed with conductive carbon. The positive terminal and battery case are connected to each other by the resistance of the semiconductive resin packing 11 through electron conduction.

On the other hand, although not shown, the negative terminal is sealing-fixed to the terminal supporting plate of aluminum alloy by caulking through the semiconductive resin packing of insulating polyphenylene sulfide (PPS). The negative terminal 5 and battery case are electrically insulated from each other.

Incidentally, the example was given in which the resin packing 11 is made of polyphenylene sulfide. However, other kinds of resin may be employed. These materials may be polypropylene, polyethylene polyethylene terephthalate, etc. These resins are insulating, but can be given conductivity by adding a suitable amount of conductive carbon.

In Example 7 also, for the same reason as in Examples 1 to 6, the resistance between the positive terminal and the battery case must be set in the range from 1Ω to 1 MΩ. The resistance can be adjusted by adjusting the conductivity, sectional area and length of the conductive packing 11. By setting the resistance between the terminal and the battery case in the above preferred range, both suppressing spark generation in assembling the composite battery and preventing the deterioration of the battery case due to the poor insulation between the terminal and the battery case can be realized to a high degree.

Example 8

Figure 4:
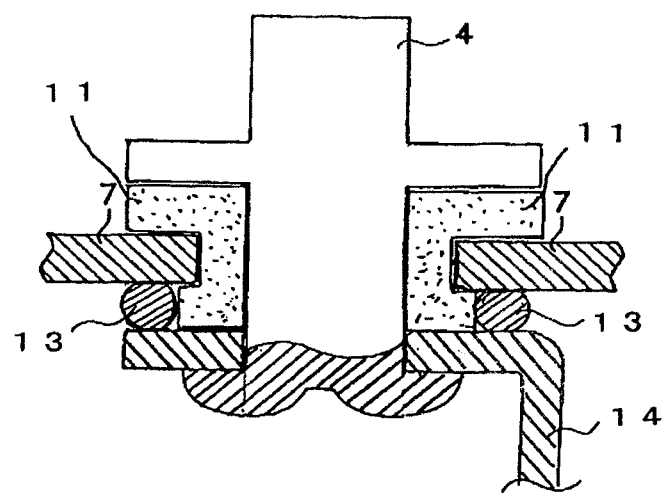
FIG. 4 is a partially enlarged longitudinal-sectional view showing the structure of a terminal for a non-aqueous electrolyte secondary battery in the case where a fixing-sealing component for the terminal is formed of a combination of resin packing and a conductive O-ring according to Example 8 of the invention.

FIG. 4 is a partially enlarged longitudinal sectional view of the terminal of the non-aqueous electrolyte secondary battery according to Example 8 of the invention. In FIG. 4, like reference numerals refer to constituent elements having the same function in FIG. 3. Reference numeral 13 denotes a O-ring.

In FIG. 4, in Example 8, in place of the semiconductive resin packing of Example 7, a combination of the resin packing 11 and the O-ring 13 is adopted. The positive terminal 4 is sealing-fixed to the terminal supporting plate 7 of aluminum alloy through the resin packing 11 of insulating polyphenylene sulfide (PPS) and semiconductive O-ring 13 of fluororesin doped with carbon. As a result, the positive terminal and the battery case are connected to each other by the resistor of the O-ring 13 through electron conduction.

On the other hand, although not shown, the negative terminal is sealing-fixed to the terminal supporting plate 7 of aluminum alloy through the resin packing 11 of insulating polyphenylene sulfide (PPS) and insulating O-ring 13. Thus, the negative terminal 5 and the battery case are insulated from each other through electron conduction.

Incidentally, the example was given in which the resin packing 11 is made of polyphenylene sulfide. However, other kinds of resin may be employed. These materials may be polypropylene, polyethylene, polyethylene terephthalate, etc.

In Example 8 also, for the same reason as in Examples 1 to 7, the resistance between the positive terminal and the battery case must be set in the range from 1Ω to 1 MΩ. By adjusting the conductivity, sectional area and length of the semiconductive O-ring 13, the resistance between the terminal and the battery case can be set in the above preferred range. As a result, both suppressing spark generation in assembling the composite battery and preventing the deterioration of the battery case due to the poor insulation between the terminal and the battery case can be realized to a high degree.

Further, in Examples 1 to 8 described above, although the example was given in which the battery exterior body is composed of the battery case, cover plate and terminal supporting plates, the configuration of this battery exterior body can be optionally designed. Without using the terminal supporting plates, the insulating cylinders may be directly brazed into the opening slot of the cover plate. The positive terminal and negative terminal may be arranged on the side of the battery case.

Further, in Examples 1 to 8, the non-aqueous secondary battery was explained. This invention can be also equally applied to the non-aqueous electrolyte battery of the primary battery. The non-aqueous electrolyte battery includes a polymer battery.

In Examples 1 to 8, the example was given in which the battery case containing aluminum such as aluminum or aluminum alloy is employed; the resistance between the positive terminal and the battery case is set in the range from 1Ω to 1 MΩ; and the negative terminal and the battery case are insulated from each other. In addition to this case, the same effect can be provided also in the case where the battery case containing "iron with nickel-plated steel plate" and "stainless steel" is employed; the resistance between the negative terminal and the battery case is set in the range from 1Ω to 1 MΩ; and the positive terminal and the battery case are insulated from each other.

Particularly, if the same test as in Table 1 is carried out using the battery case containing iron as described above, the same status of spark generation as Table 1 results. This is apparent from the operating theory of this invention. Further, also in the case where the battery case containing iron as described above is employed, like Example 1, it is preferable that the negative active material is carbon and the positive active material is lithium cobalt oxide.

Further, the non-aqueous electrolyte is preferably an organic solvent containing cyclic carbonic ester such as ethylenecarbonate or propylenecarbonate and chain carbonic ester such as diethylcarbonate, dimethylcarbonate or ethylmetylcarbonate, in which lithium salt such as $LiPF_6$ is dissolved. Further, also in the case where the battery case containing iron described above, it is preferable that the negative terminal is fixed to the battery case through insulator and the resistor connecting the negative terminal and battery case through electron conduction is a film fixed to the insulator.

Although this invention has been explained in detail or with reference to specific embodiments, it is apparent to those skilled in the art that various changes or modifications can be made without departing from the sprit and range of this invention.

The present application is based on Japanese Patent Application (2003-407181) filed on Dec. 5, 2003, the teachings of which are hereby incorporated by reference.

The invention claimed is:

1. A non-aqueous electrolyte battery comprising:
a battery case having a plurality of opening slots;
a positive electrode terminal inserted through one of the opening slots and attached to the battery case;
a negative electrode terminal inserted through another one of the opening slots and attached to the battery case and insulated therefrom; and
a resin packing comprising a cylindrical portion having two ends and a first flange portion attached to one end of the cylindrical portion,
wherein the cylindrical portion is inserted between an inner peripheral surface of the one of the opening slots and an outer peripheral surface of the positive electrode terminal,
the first flange portion is in contact with and extends along an outer surface of the battery case,
the resin packing comprises a semiconductive resin portion,
the positive electrode terminal and the battery case are electrically connected through the semiconductive resin portion,
the semiconductive resin portion includes a conductive carbon, and
the semiconductive resin portion comprises a resin selected from the group consisting of polyphenylene sulfide and polyethylene terephthalate.

2. The non-aqueous electrolyte battery according to claim 1, wherein the battery case comprises aluminum.

3. The non-aqueous electrolyte battery according to claim 1, wherein the resin packing comprises a second flange portion attached to the other end of the cylindrical portion.

4. A non-aqueous electrolyte battery comprising;
a battery case having a plurality of opening slots;
a positive electrode terminal inserted through one of the opening slots and attached to the battery case;
a negative electrode terminal inserted through another one of the opening slots and attached to the battery case and insulated therefrom;
a resin packing comprising a cylindrical portion having two ends and a first flange portion attached to one end of the cylindrical portion; and
a semiconductive resin ring externally fit on the other end of the cylindrical portion,
wherein the cylindrical portion is inserted between an inner peripheral surface of the one of the opening slot and an outer peripheral surface of the positive electrode terminal,
the first flange portion is in contact with and extends along an outer surface of the battery case,
the positive electrode terminal and the battery case are electrically connected through the semiconductive resin ring,
the semiconductive resin ring includes a conductive carbon, and the semiconductive resin ring comprises a resin selected from the group consisting of polyphenylene sulfide, and polyethylene terephthalate.

\* \* \* \* \*